July 18, 1950          J. E. SUGDEN          2,515,910
PITMAN, CRANKPIN, AND BOXING FOR MOWING MACHINES
Filed Aug. 22, 1945
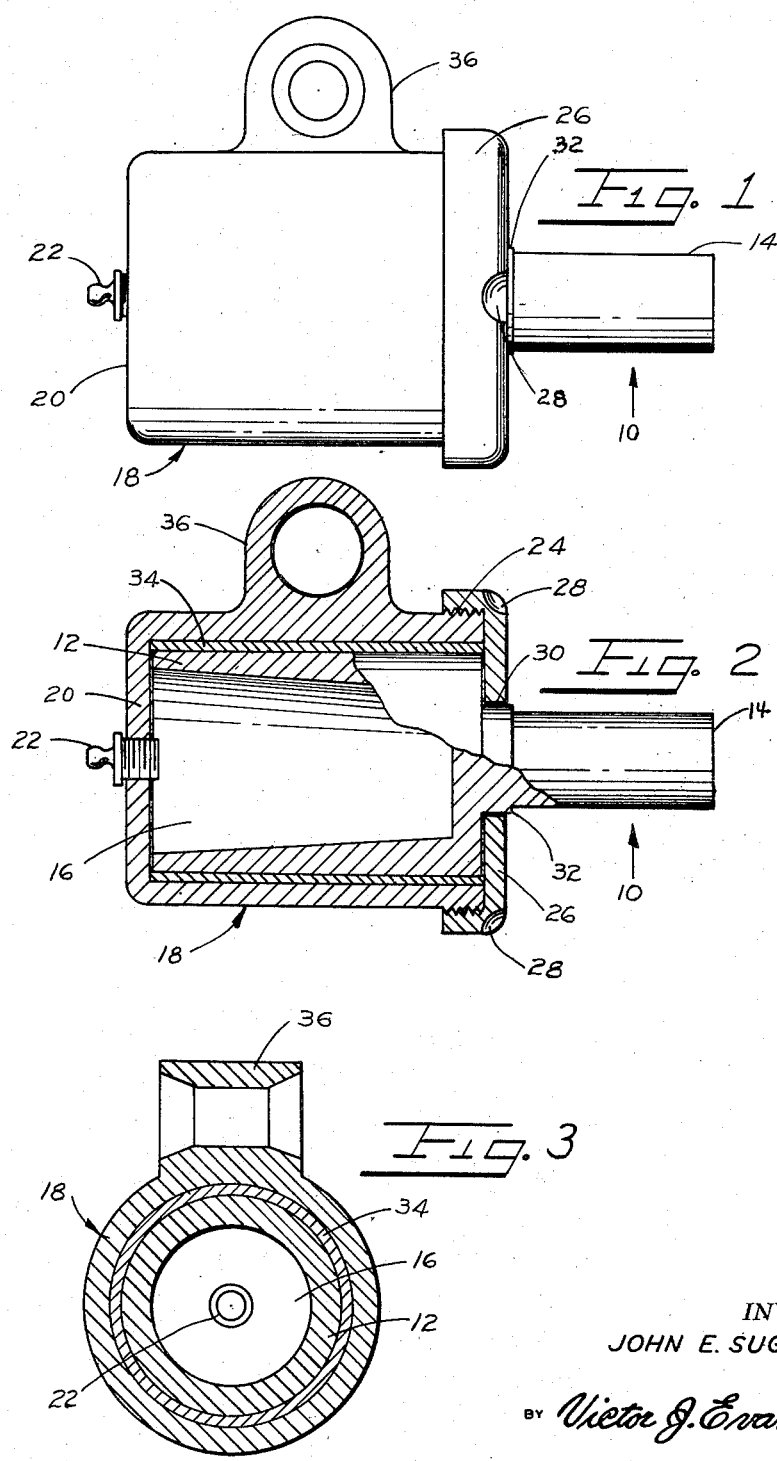
INVENTOR.
JOHN E. SUGDEN
BY *Victor J. Evans & Co.*
ATTORNEYS Patented July 18, 1950

2,515,910

UNITED STATES PATENT OFFICE 2,515,910

PITMAN, CRANKPIN, AND BOXING FOR MOWING MACHINES

John E. Sugden, Richland Center, Wis.

Application August 22, 1945, Serial No. 612,016

1 Claim. (Cl. 308—121)

This invention relates to improvements in pitman, crank pin and boxing for mowing machines.

The principal object of the invention is to provide a pitman, crank pin and housing for hay mowing machines and the like, that is large and light and will retain the grease and oil for a longer period.

To accomplish this, a journal is made of larger diameter than its associated pin which is attached to the flywheel. Thus, the journal is enclosed tightly with the exception of the point of junction of the pin and journal.

With the above and other objects and advantages in view, as will appear as the nature of the invention is better understood, the same consists in the novel construction, combination and arrangement of parts hereinafter more fully described, illustrated in the accompanying drawing and pointed out in the appended claim.

In the drawing forming a part of this specification and in which like characters refer to like parts throughout the several views:

Figure 1 is a side elevation of an embodiment of the invention;

Figure 2 is a longitudinal sectional view thereof and

Figure 3 is a transverse or cross sectional view thereof.

Referring more in detail to the drawing, the reference numeral 10 designates a crank pin customarily attached eccentrically to a drive wheel and which is provided with a circular journal 12 which is formed integrally with and of greater circumference than the shank 14 of the crank pin 10.

The journal 12 is provided with a conical shaped recess 16 to retain the lubricating medium therein.

The journal 12 is rotatably mounted in a circular boxing or housing 18 which is provided at its closed end 20 with a grease fitting 22 and is externally threaded on the outer periphery of its open end at 24 to receive the complementary internally threaded collar 26.

Grease feed through the fitting 22 will enter and fill the conical shaped recess 16 of the journal 12.

The collar 26 is provided with indentures 28 to receive the jaws of a tool for the removal thereof from the housing 18.

The collar 26 is provided at the medial point thereof with an opening 30 which is of size, shape and circumference to rotatably fit a spacing ring or shoulder 32 formed on the shank 14 of the crank pin 10.

With this structure, the housing 18 is retained in position on the crank pin 10.

The spacing ring or shoulder 32 retains the journal 12 in spaced relation with the pitman wheel or drive wheel to which the shank 14 of the pin 10 is connected.

The housing 18 is provided with a close fitting bushing 34 in which the journal 12 rotates.

The housing 18 is provided on its outer surface with an integral eye 36 for connecting and retaining the housing with a pitman, not shown.

It is the experience of most operators of farming machines and the like that the pitman boxing requires more attention than any part of the machinery as far as keeping the pitman greased and repaired. The reason for this is that centrifugal force throws the oil and grease out of the ordinary type housing. With the type of housing previously described and a journal having a greater diameter than the shank of the crank pin 10, the centrifugal force tends to hold the grease in the hollow housing rather than throw it out.

It is believed that the operation of the device will be apparent to those skilled in the art and that a device has been provided that will accomplish the object of the invention.

It is to be understood, however, that slight changes and modifications in the size, shape and proportions of the various parts may be made without departing from the spirit of the invention or the scope of the appended claim.

Having thus described the invention, what is claimed as new and desired to be secured by Letters Patent is:

A device of the character described comprising a crank pin, a journal of greater diameter than the crank pin and formed integrally therewith and provided with a hollow tapered central portion, the diameter of the hollow portion becoming greater as it proceeds away from the pin, a housing for the journal revolubly mounted thereon, a spacing ring on the pin adjacent the journal, a removable collar for the housing having a central opening of a size to rotatably fit the ring, said ring spacing said journal from the part to which it is connected by means of said pin, and a grease feed fitting mounted in the wall of the housing and communicating with the hollow portion of the journal.

JOHN E. SUGDEN.

REFERENCES CITED

The following references are of record in the file of this patent:

UNITED STATES PATENTS

| Number | Name | Date |
|---|---|---|
| 159,909 | Dierker | Feb. 16, 1875 |
| 400,231 | Leffler | Mar. 26, 1889 |
| 1,101,954 | Petry | June 30, 1914 |
| 1,169,531 | Crane | Jan. 25, 1916 |
| 1,454,021 | Litchfield | May 1, 1923 |
| 1,481,918 | Lowe | Jan. 29, 1924 |
| 2,189,266 | Klages | Feb. 6, 1940 |